United States Patent
Niemi et al.

(10) Patent No.: US 11,212,324 B2
(45) Date of Patent: Dec. 28, 2021

(54) HANDLING OF IP MULTIMEDIA SUBSYSTEM VOPS INDICATION

(71) Applicant: MEDIATEK INC., Hsin-Chu (TW)

(72) Inventors: Marko Niemi, Oulu (FI); Chien-Chun Huang-Fu, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 70 days.

(21) Appl. No.: 16/532,601

(22) Filed: Aug. 6, 2019

(65) Prior Publication Data

US 2020/0053134 A1 Feb. 13, 2020

Related U.S. Application Data

(60) Provisional application No. 62/716,397, filed on Aug. 9, 2018.

(51) Int. Cl.
| | |
|---|---|
| *H04W 8/08* | (2009.01) |
| *H04L 29/06* | (2006.01) |
| *H04W 80/10* | (2009.01) |

(52) U.S. Cl.
CPC ...... *H04L 65/1016* (2013.01); *H04L 65/1069* (2013.01); *H04L 65/1073* (2013.01); *H04W 8/08* (2013.01); *H04W 80/10* (2013.01)

(58) Field of Classification Search
CPC .............. H04L 65/1016; H04L 65/1073; H04L 65/1069; H04W 80/10; H04W 8/08; H04W 48/18; H04W 8/06; H04W 60/00
See application file for complete search history.

(56) References Cited

U.S. PATENT DOCUMENTS

| | | | |
|---|---|---|---|
| 2015/0358477 A1 | 12/2015 | Jeong et al. | ............ 370/259 |
| 2018/0132141 A1 | 5/2018 | Huang-Fu et al. | |
| 2020/0120470 A1* | 4/2020 | Arshad et al. | ......... H04W 4/90 |

FOREIGN PATENT DOCUMENTS

| | | |
|---|---|---|
| CN | 104956702 A | 7/2013 |
| CN | 106488519 A | 8/2015 |
| CN | 108702593 A | 11/2016 |

OTHER PUBLICATIONS

3rd Generation Partnership Project; Technical Specification Group Core Network and Terminals; 5G System—Phase 1; CT WG1 Aspects, Mar. 29, 2018.*

(Continued)

*Primary Examiner* — Marcos L Torres
(74) *Attorney, Agent, or Firm* — Imperium Patent Works; Zheng Jin

(57) ABSTRACT

A solution of supporting IP multimedia subsystem (IMS) call setup in a next generation system (5GS) is proposed. During a registration procedure, the network sends indications to a user equipment (UE) indicating whether IMS voice over PS session (VoPS) over 3GPP access and over non-3GPP access is supported or not. The indications comprise two independent indicators, one indicator for indicating whether IMS VoPS is supported over 3GPP access, and the other indicator for indicating whether IMS VoPS is supported over non-3GPP access. In one example, the two independent indicators are included in a 5GS network feature support information element (IE) carried by a registration accept message sent from the network during the registration procedure.

20 Claims, 3 Drawing Sheets

(56) References Cited

OTHER PUBLICATIONS

International Search Report and Written Opinion of International Search Authority for PCT/CN2019/099887 dated Oct. 31, 2019 (11 pages).
C1-174344 3GPP TSG-CT WG1 Meeting #106, Huawei et al., "IMS voice over PS session supported indication", Kochi, India, Oct. 23-27, 2017 (4 pages). *section 2, section 8.5.2.2.2.4, section 12.5.1*.
C1-184346 3GPP TSG-CT WG1 Meeting #111bis, MediaTek Inc., "One bit VoPS indicator", Sophia-Antipolis, France, Jul. 9-13, 2018 (3 pages). *section 9.10.3.5*.
Taiwan IPO, office action for related TW patent application 108128250 (no English translation is available) dated Nov. 12, 2020 (9 pages).
C1-174344 3GPP TSG-CT WG1 Meeting #106, Huawei et al., "IMS voice over PS session supported indication", Kochi, India, Oct. 23-27, 2017 (4 pages), *section 12.5.1*.
C1-184603 3GPP TSG-CT WG1 Meeting #111 bis, MediaTek Inc., "Clarification to VoPS Indicator", Sophia-Antipolis, France, Jul. 9-13, 2018 (11 pages) *section 5.5.1.2.4, 5.5.1.3.4, 9.10.3.5*.
C1-181728, 3GPP TSG-CT WG1 Meeting #109, SamSung R&D UK et al., Adding definition of the "5GS network feature support" information element, Mar. 2, 2018.
C1-184603 3GPP TSG-CT WG1 Meeting #111 bis, MediaTek Inc., "Clarification to VoPS Indicator", Sophia-Antipolis, France, Jul. 9-13, 2018.

* cited by examiner

5GS NETWORK FEATURE SUPPORT IE

HANDLING OF IP MULTIMEDIA SUBSYSTEM VOPS INDICATION

CROSS REFERENCE TO RELATED APPLICATIONS

This application claims priority under 35 U.S.C. § 119 from U.S. Provisional Application No. 62/716,397, entitled "Handling of IMS VoPS and EMC indication", filed on Aug. 9, 2018, the subject matter of which is incorporated herein by reference.

TECHNICAL FIELD

The disclosed embodiments relate generally to wireless communication, and, more particularly, to method of supporting multimedia services and IP multimedia subsystem (IMS) VoPS indication in next generation mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

As set forth in the 3GPP, IP Multimedia Subsystem (IMS) is a core network that provides IP multimedia services to user equipments (UEs) over an Internet Protocol (IP) network. Historically, mobile phones have provided voice call services over a circuit-switched (CS) network, rather than strictly over an IP packet-switched (PS) network. Alternative methods of delivering voice or other multimedia services over. IP have become available on smartphones (e.g. VoIP or Skype), but they have not become standardized across the industry. IMS is an architectural framework to provide such standardization. IMS able to communicate with UEs through different types of access network, such as a wireless local area network (WLAN), an Ethernet network, a packet data network (PDN), or another type of access network. IMS is a new way to dial PS call on LTE (Voice over IP or Voice over LTE) instead of fallback to 2G/3G legacy CS call.

The Next Generation Mobile Network (NGMN) board, has decided to focus the future NGMN activities on defining the end-to-end requirement for 5G. Voice service will be an important feature for the next generation system, e.g., NG system (NGS) or 5G system (5GS). It is proposed that the NG/5G systems shall support IMS voice over PS (VoPS) service, IMS VoPS service continuity with the 4G evolved packet system (EPS), and INS VoPS service fallback to EPS. However, when a voice call is triggered, a UE may be in conditions where voice service is not supported. In this case, the UE shall move to a proper access or core system to continue the voice call setup.

According to the current specification, the network should indicate the IMS VoPS capability associated with the current access type. However, it is not defined how the network should set such indication for different access types. It is not defined how the UE should behave when receiving the indication for the different access types. Solutions are sought.

SUMMARY

A solution of supporting IP multimedia subsystem (IMS) call setup in a next generation system (5GS) is proposed. During a registration procedure, the network sends indications to a UE indicating whether IMS voice over PS session (VoPS) over 3GPP access and over non-3GPP access is supported or not. The indications comprise two independent indicators, one indicator for indicating whether IMS VoPS is supported over 3GPP access, and the other indicator for indicating whether IMS VoPS is supported over non-3GPP access. In one example, the two independent indicators are included in a 5GS network feature support information element (IE) carried by a registration accept message sent from the network during the registration procedure.

In one embodiment, a UE transmits a registration request message in a mobile communication network. The registration request message is sent over 3GPP access or non-3GPP access. The UE receives a registration accept message from the network. The accept message comprises IP Multimedia Subsystem (IMS) voice over Packet-Switched (VoPS) indications. The UE determines whether IMS VoPS is supported over 3GPP access and non-3GPP access. The UE registers to another RAT for IMS VoPS service when IMS VoPS is not supported over a current RAT. In one embodiment, the IMS VoPS indications comprise a first bit indicating whether IMS VoPS is supported over 3GPP access, and a second bit indicating whether IMS VoPS is supported over non-3GPP access.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
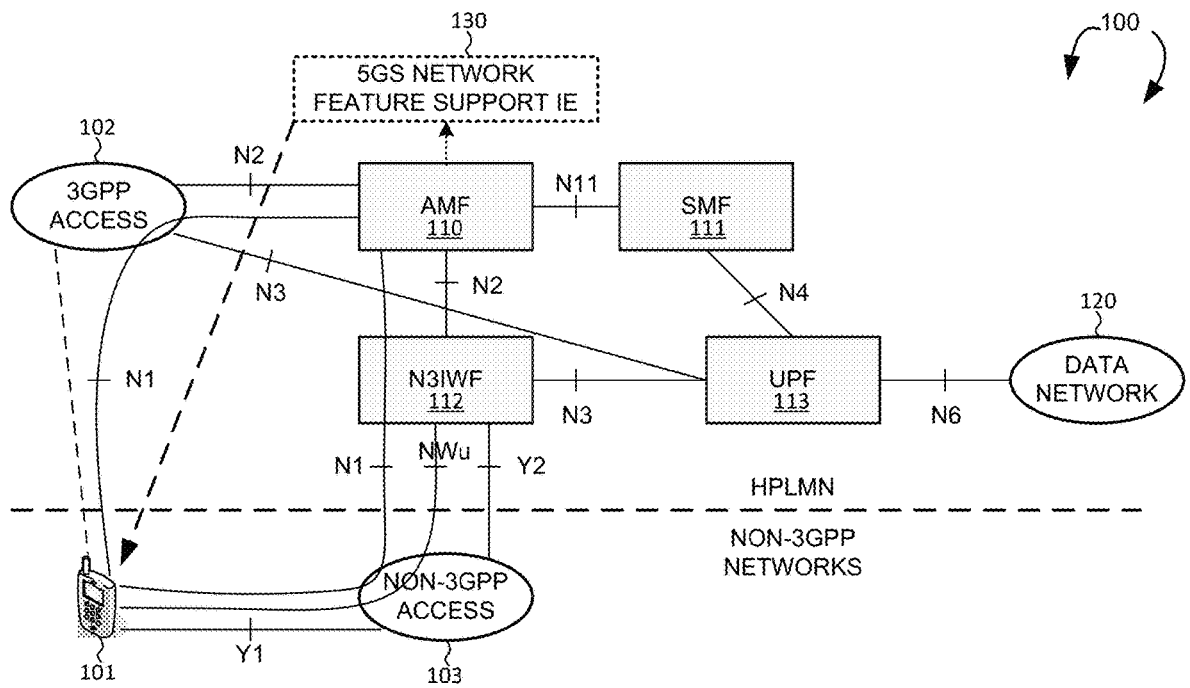
FIG. 1 illustrates an exemplary next generation system with multiple access and core networks and a user equipment (UE) handling IP multimedia subsystem (IMS) VoPS indication for IMS VoPS service in accordance with one novel aspect.

FIG. 1 illustrates an exemplary next generation system 100 with multiple access and core networks and a user equipment (UE) 101 handling IP multimedia subsystem (IMS) VoPS indication for IMS VoPS service in accordance with one novel aspect. Next generation 5G New Radio (NR) system 100 comprises 3GPP radio access network 102, non-3GPP access network 103, Access and Mobility Function (AMF) 110, Session Management Function (SMF) 111, Non-3GPP Interworking Function (N3IWF) 112, User Plane Function (UPF) 113, and data network 120 connecting to different application servers including an IP multimedia subsystem (IMS) server. AMF 110 receives all connection and session related information from the UE (N1/N2) but is responsible only for handling connection and mobility management tasks. All messages related to session management are forwarded over N11 reference interface to SMF 111. N3IWF 112 is responsible for routing messages outside the 5G RAN. UPF 113 is responsible for routing and forwarding with packet inspection and QoS handling.

3GPP Radio access network RAN 102 may include base stations (gNBs or eNBs) providing radio access for UE 101 via various 3GPP radio access technologies (RATs) including 5G, 4G, and 3G/2G. Non-3GPP access network 103 may include access points (APs) providing radio access for UE 101 via non-3GPP RAT including WiFi. UE 101 can access data network 120 through 3GPP access 102, AMF 110, SMF 111, and UPF 113. UE 101 can access data network 120 through non-3GPP access 103, N3IWF 112, AMF 110, SMF 111, and UPF 113. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

IP Multimedia Subsystem (IMS) is a core network that provides IP multimedia services to user equipments (UEs) over an Internet Protocol (IP) network. The Next Generation Mobile Network (NGMN) board, has decided to focus the future NGMN activities on defining the end-to-end requirements for 5G. Voice service will be an important feature for the next generation system, e.g., NG system (NGS) or 5G system (5GS). It is proposed that the NG/5G systems shall support IMS PS voice service, IMS PS voice service continuity with the 4G evolved packet system (EPS), and IMS PS voice service fallback to EPS. However, when a voice call is triggered, a UE may be in conditions where voice service is not supported. In this case, the UE shall move to a proper access network or core system to continue the voice call setup. According to the current specification, the network should indicate the IMS VoPS capability associated with the current access type. However, it is not defined how the network should set such indication for different access types. It is not defined how the UE should behave when receiving the indication for the different access types.

In accordance with one novel aspect, a method for handling IMS VoPS indication and supporting IMS call setup in a next generation NG/5G system is proposed. In the example of FIG. 1, during an attach or registration procedure (including initial registration, and mobility and periodic registration update), UE 101 receives indications from the network indicating whether IMS VoPS over 3GPP access and non-3GPP access is supported or not. The indications can have two bits for two independent indicators, one bit indicates whether IMS VoPS is supported over 3GPP access, another bit indicates whether IMS VoPS is supported over non-3GPP access. UE 101 sends the registration request either via 3GPP access (e.g., a serving gNB), or via non-3GPP access (e.g., a WiFi AP). UE 101 then receives the registration accept with the IMS VoPS indication. Based on the indications, UE 101 can decide whether it should stay in the original RAT or register to another RAT for voice service. In one example, the registration accept message provided by AMF 110 comprises a network feature support IE 130, which comprises multiple independent indicators indicating whether IMS VoPS is supported over different radio access technologies (RATs), e.g., 3GPP and non-3GPP access.

Figure 2:
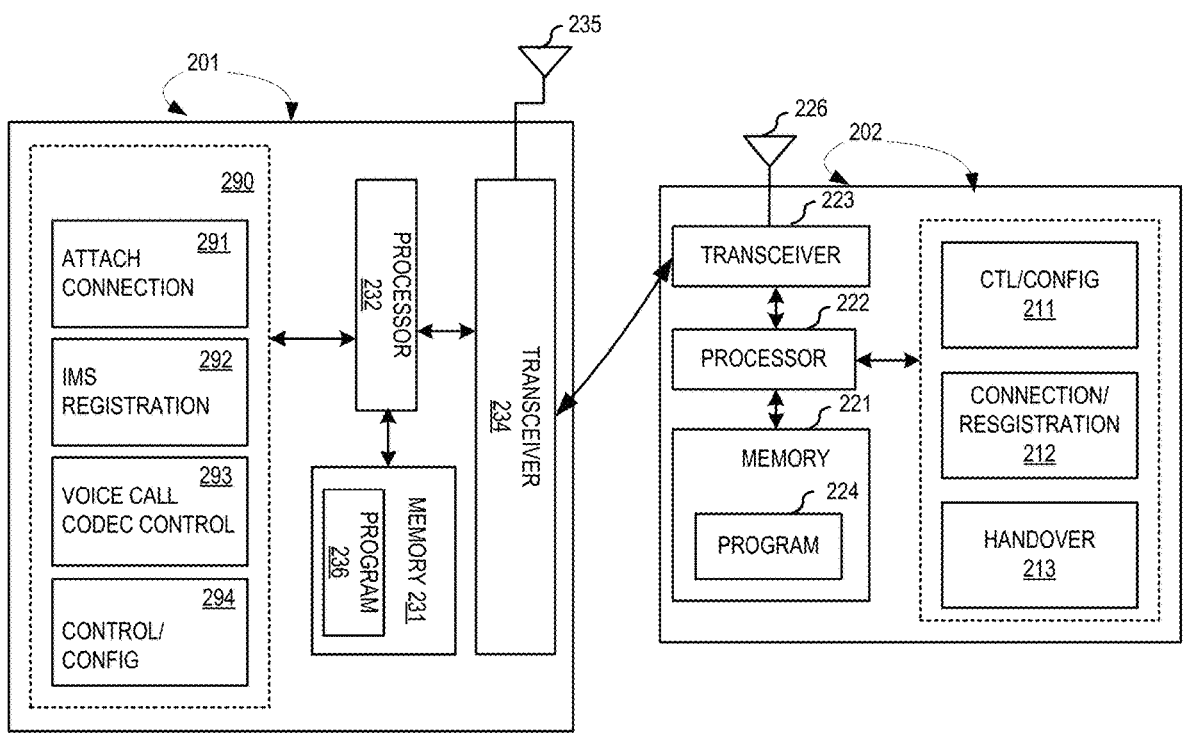
FIG. 2 illustrates simplified block diagrams of a user equipment (UE) and a base station (BS) in accordance with embodiments of the current invention.

FIG. 2 illustrates simplified block diagrams of a user equipment UE 201 and a base station BS 202 in accordance with embodiments of the current invention. BS 202 may have an antenna 226, which may transmit and receive radio signals. RF transceiver module 223, coupled with the antenna, may receive RF signals from antenna 226, convert them to baseband signals and send them to processor 222. RF transceiver 223 may also convert received baseband signals from processor 222, convert them to RF signals, and send out to antenna 226. Processor 222 may process the received baseband signals and invoke different functional modules to perform features in BS/AP 202. Memory 221 may store program instructions and data 224 to control the operations of BS 202. BS 202 may also include a set of functional modules and control circuits, such as a control and configuration circuit 211 for control and configure IMS related features including providing two indicators—"IMS VoPS Supported over 3GPP access" and "IMS VoPS Supported over non-3GPP access"—to UE, a connection and registration handling circuit 212 for establish connection and registration with UE, and a handover circuit 213 for sending handover commands to UE.

Similarly, UE 201 has an antenna 235, which may transmit and receive radio signals. RF transceiver module 234, coupled with the antenna, may receive RF signals from antenna 235, convert them to baseband signals and send them to processor 232. RF transceiver 234 may also convert received baseband signals from processor 232, convert them to RF signals, and send out to antenna 235. Processor 232 may process the received baseband signals and invoke different functional modules to perform features in the UE 201. Memory 231 may store program instructions and data 236 to control the operations of the UE 201. UE 201 may also include a set of function modules and control circuits that may carry out functional tasks of the present invention. An attach and connection circuit 291 may attach to the network and establish connection with serving base station, an IMS registration circuit 292 may perform IMS registration with IMS server, a voice call and codec control circuit 293 may originate or terminate voice calls and negotiate codec parameters, and a control and configuration circuit 294 for control and configure IMS related features including handling two indicators—"IMS VoPS Supported over 3GPP access" and "IMS VoPS Supported over non-3GPP access".

The various function modules and control circuits may be implemented and configured by software, firmware, hardware, and combination thereof. The function modules and circuits, when executed by the processors via program instructions contained in the memory, interwork with each other to allow the base station and UE to perform embodiments and functional tasks and features in the network. Each module or circuit may comprise a processor (e.g., 222 or 232) together with corresponding program instructions. In one example, UE sends a registration request either via 3GPP access (e.g., a serving gNB), or via non-3GPP access (e.g., a WiFi AP). UE then receives a registration accept with the IMS VoPS indication. Based on the indication, UE can decide whether it should stay in the original RAT or register to another RAT for IMS VoPS service.

Figure 3:
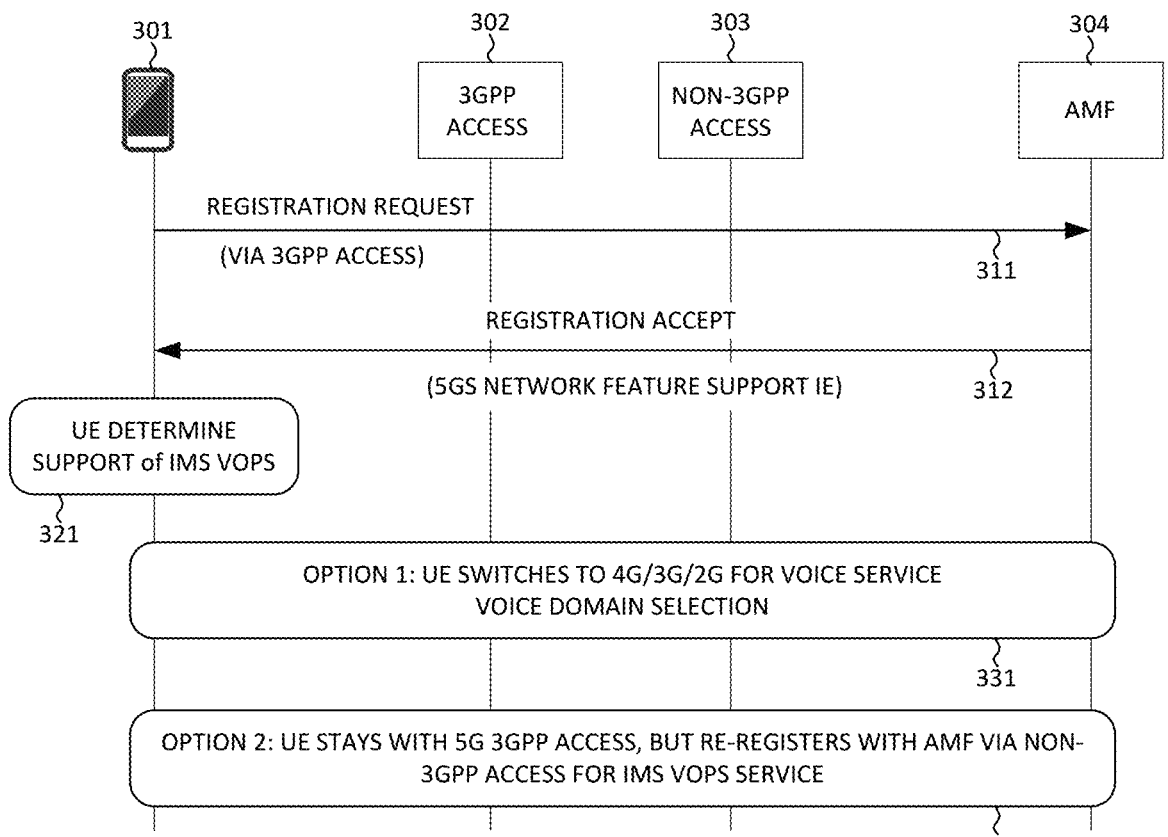
FIG. 3 illustrates a first embodiment of a method for handling IMS VoPS indication and UE behavior in a next generation system in accordance with embodiments of the current invention.

FIG. 3 illustrates a first embodiment of a method for handling IMS VoPS indication and UE behavior in a next generation system in accordance with embodiments of the current invention. In step 311, UE 301 attaches to the network by sending a registration request message to AMF 304. The registration request message can be an initial registration, or a periodic or mobility registration update. In the embodiment of FIG. 3, the registration request is sent via 3GPP access 302, e.g., via a 5G base station over 5G RAT to AMF 304, and therefore the current RAT for UE 301 is 3GPP. In step 312, UE 301 receives a registration accept message from AMF 304. The Registration Accept message carries indication for IMS VoPS capability associated with different access type, e.g., both 3GPP access type and non-3GPP access type, regardless of what is the current access type used by the UE. Upon receipt of the indication whether IMS VoPS is supported over which access type, in step 321, UE 301 can determine whether the current 5G RAT supports IMS VoPS, and whether another RAT supports IMS VoPS. If the current 5G RAT supports IMS VoPS, then UE 301 stays with the current RAT, and performs IMS registration with an IMS server for IMS service. On the other hand, if the current 5G RAT does not support IMS VoPS, then UE 301 have different options to handle such situation.

In a first option, in step 331, UE 301 can perform Voice Domain Selection procedures as defined in the 3GPP specification. If UE 301 is set to "voice centric" for 5GS, then UE 301 should always try to ensure that voice service is possible. A voice centric 5GC capable and EPC capable UE unable to obtain voice service in 5GS should not select a cell connected only to 5GS. By disabling capabilities to access 5GS, the UE re-selects to E-UTRAN connected to EPC first. When the UE selects E-UTRAN connected to EPC, the UE performs Voice Domain Selection procedures. After registration to EPS, the UE decides whether VoLTE, CSFB, CS call will be applied by checking the IMS VoPS indication, success of combined attached, indication of "SMS only", etc. In a second option, in step 332, UE 301 can stay in the current 5G 3GPP RAT, but also try to register with the network over non-3GPP access for IMS VoPS service if the indication indicates that IMS VoPS is supported over non-3GPP access. If the selection fails, including the case when, during the registration performed over either 3GPP or non-3GPP access, the UE receives the IMS Voice over PS session Not Supported over Non-3GPP Access indication, the UE should attempt selecting the other access types in the selected PLMN, if any. If that selection fails too, or it is not possible, then the UE may select another PLMN.

Figure 4:
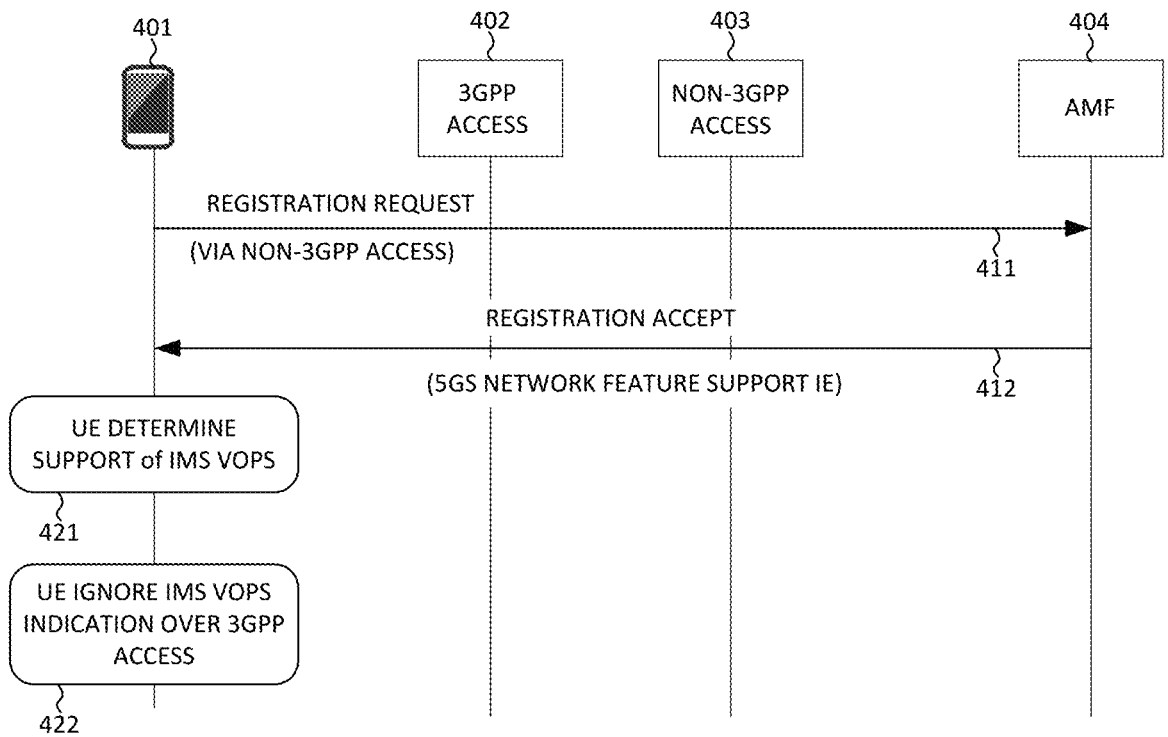
FIG. 4 illustrates a second embodiment of a method for handling IMS VoPS indication and UE behavior in a next generation system in accordance with embodiments of the current invention.

FIG. 4 illustrates a second embodiment of a method for handling IMS VoPS indication and UE behavior in a next generation system in accordance with embodiments of the current invention. In step 411, UE 401 attaches to the network by sending a registration request message to AMF 404. The registration request message can be an initial registration, or a periodic or mobility registration update. In the embodiment of FIG. 4, the registration request is sent via non-3GPP access 403, e.g., via a WiFi AP over WLAN to AMF 404, and therefore the current RAT for UE 301 is non-3GPP. In step 412, UE 401 receives a registration accept message from AMF 404. The registration accept message carries multiple independent indicators for IMS VoPS capability associated with different access types, e.g., both 3GPP access type and non-3GPP access type, regardless of what is the current access type used by the UE. Upon receipt of the indicators on whether IMS VoPS is supported over which access type, in step 421, UE 401 can determine whether the current RAT supports IMS VoPS, and whether another RAT supports IMS VoPS. If the current non-3GPP RAT supports IMS VoPS, then UE 401 stays with the current RAT, and performs IMS registration with an IMS server for IMS service. On the other hand, if the current non-3GPP RAT does not support IMS VoPS, then UE 401 may have different options.

Although the indication contains two independent indicators that indicate whether IMS VoPS is supported over both 3GPP access and over non-3GPP access, sometimes the indicators may contain incorrect information and UE needs to either report an error or ignore the incorrect information. For example, when UE is registered over non-3GPP access, and then receives the indication indicating whether IMS VoPS is supported over 3GPP access, then such indication may be incorrect. This is because for 3GPP access, the support of IMS VoPS is regional, e.g., depending on the area where the UE is located. As a result, in step 422, UE 401 should stay with the current non-3GPP RAT, and ignore the incorrect information carried by the indication. UE 401 could also send a 5GMM status message with proper error cause to the network. However, if the IMS VoPS support is homogeneous in all regions for 3GPP access while UE is registered over non-3GPP access, then UE is allowed to consider the IMS VoPS capability over 3GPP access.

Figure 5:
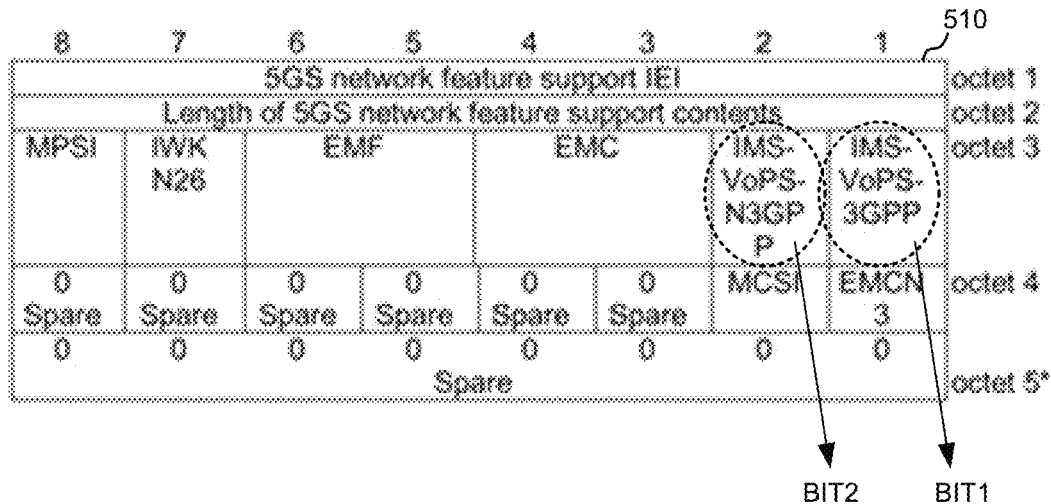
FIG. 5 illustrates a 5GS network feature support IE comprising IMS VoPS information over 3GPP access and non-3GPP access in accordance with a novel aspect of the current invention.

FIG. 5 illustrates a 5GS network feature support IE comprising IMS VoPS information over 3GPP access and non-3GPP access in accordance with a novel aspect of the current invention. The registration accept message comprises the 5GS network feature support IE, as depicted by FIG. 5 table 510. In the embodiment of FIG. 5, the 5GS network feature support IE includes two bits, each bit represents an independent indicator for IMS VoPS support over 3GPP access and over non-3GPP access. For example, in octet 3 of the IE, bit1 is an indicator for IMS VoPS over 3GPP access, and bit2 is an indicator for IMS VoPS over non-3GPP access. If bit1 is set to "1", it means that IMS VoPS is supported over 3GPP access, and if bit1 is set to "0", it means that IMS VoPS is not supported over 3GPP access. Similarly, if bit2 is set to "1", it means that IMS VoPS is supported over non-3GPP access, and if bit2 is set to "0", it means that IMS VoPS is not supported over non-3GPP access.

Based on the above embodiment, the network (AMF) should set the IMS voice over PS session indicator in the 5GS network feature support IE to a) "IMS voice over PS session not support over non-3GPP access" if the REGISTRATION REQUEST message was received over non-3GPP access or 3GPP access and the network does not support IMS VoPS in 5GS over non-3GPP access; b) "IMS voice over PS session supported over 3GPP access" if the REGISTRATION REQUEST message was received over 3GPP access and the network supports IMS VoPS in 5GS over 3GPP access (i.e., in NR and/or E-UTRA connected to 5GCN); c) "IMS voice over PS session supported over non-3GPP access", if the REGISTRATION REQUEST message was received over 3GPP access or non-3GPP access and the network supports IMS VoPS in 5GS over non-3GPP access; or d) "IMS voice over PS session not supported over 3GPP access", if the REGISTRATION REQUEST message was received over 3GPP access and the network does not support IMS VoPS in 5GS over 3GPP access (i.e., in NR and/or E-UTRA connected to 5GCN).

In another embodiment, the network can use a three-bit indication for separately indicating whether IMS VoPS is supported over different RATS. Under this embodiment, the AMF can indicate whether IMS VoPS is supported over NR, LTE, and non-3GPP access independently via the 5GS network feature support IE having a three-bit indication. For example, a first bit used to indicate whether IMS VoPS is supported over 5G NR, a second bit is used to indicate whether IMS VoPS is supported over 4G LTE, and a third bit used to indicate whether IMS VoPS is supported over non-3GPP access. At reception of the indicators, UE can stay with the current RAT for IMS VoPS service if IMS VoPS is supported in the current RAT, UE can register to another RAT or perform voice domain selection for IMS VoPS service if IMS VoPS is not supported in the current RAT but is supported in another RAT, or ignore incorrect information carried by the indication.

Figure 6:
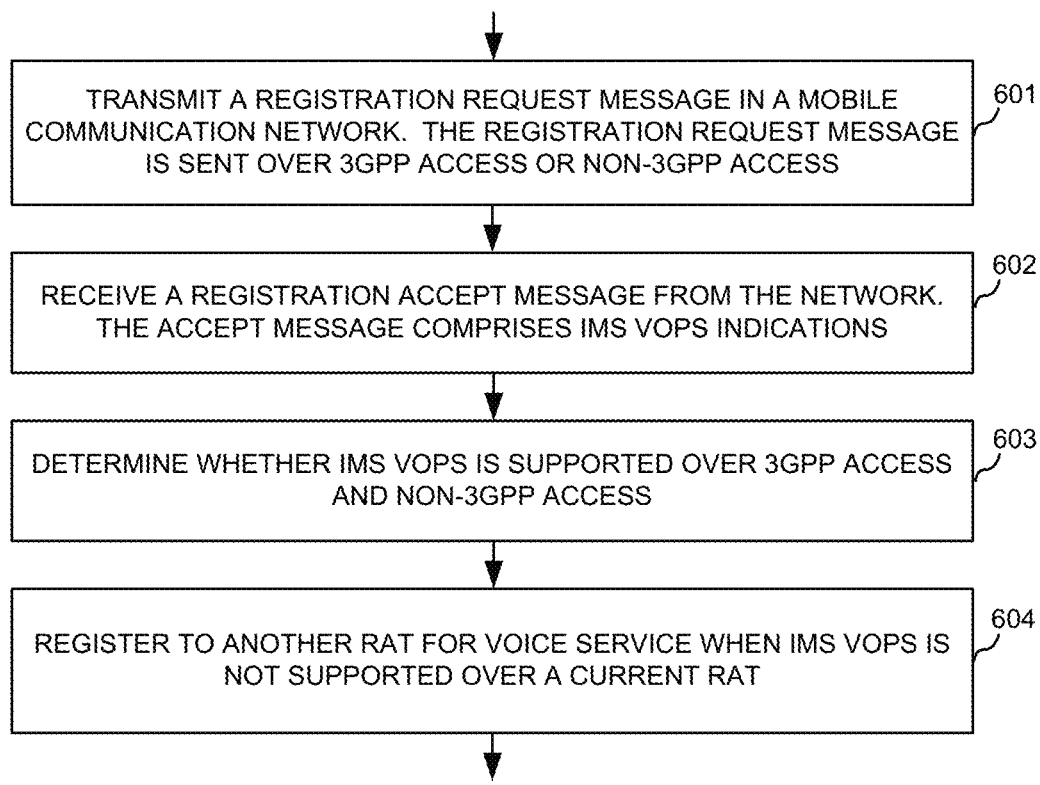
FIG. 6 is a flow chart of a method of handling IMS VoPS indication and supporting IMS VoPS service accordance with a novel aspect.

FIG. 6 is a flow chart of a method of handling IMS VoPS indication and supporting IMS VoPS service accordance with a novel aspect. In step 601, a UE transmits a registration request message in mobile communication network. The registration request message is sent over 3GPP access or non-3GPP access. In step 602, the UE receives a registration accept message from the network. The accept message comprises an IP Multimedia Subsystem (IMS) voice over Packet-Switched (VoPS) indication. In step 603, the UE determines whether IMS VoPS is supported over 3GPP access and non-3GPP access. In step 604, the UE registers to another RAT for voice service when IMS VoPS is not supported over a current RAT. In one embodiment, the IMS VoPS indications comprise a first bit indicating whether IMS VoPS is supported over 3GPP access, and a second bit indicating whether IMS VoPS is supported over non-3GPP access.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of handling IP multimedia subsystem (IMS) Voice over Packet-Switched (VoPS) service indication, comprising:

transmitting a registration request message from a user equipment (UE) in mobile communication network, wherein the registration request message is sent over a 3GPP access or a non-3GPP access;

receiving a registration accept message from the network, wherein the accept message comprises an IMS VoPS service indications indicating whether IMS VoPS is supported over the 3GPP and the non-3GPP access;

determining, from the received IMS VoPS service indication, whether IMS VoPS is supported over the 3GPP access and the non-3GPP access; and in response to receiving the IMS VoPS service indication sent over the 3GPP access indicating that the IMS VoPS is not supported over the 3GPP access and that the IMS VoPS is supported over the non-3GPP access, registering to the mobile communication network over the non-3GPP access or over another 3GPP access for voice service, and at another time, in response to receiving the IMS VoPS service indication sent over the non-3GPP access, of ignoring the IMS VoPS service indication for the 3GPP access.

2. The method of claim 1, wherein the registration request is an initial request, a periodic request, or a mobility request.

3. The method of claim 1, wherein the IMS VoPS indications comprise a first bit indicating whether IMS VoPS is supported over 3GPP access.

4. The method of claim 1, wherein the IMS VoPS indications comprise a second bit indicating whether IMS VoPS is supported over non-3GPP access.

5. The method of claim 1, wherein the current RAT is 3GPP access, and wherein the IMS VoPS indication indicates that IMS VoPS is not supported over the current RAT.

6. The method of claim 5, wherein the UE performs voice domain selection for voice service.

7. The method of claim 5, wherein the IMS VoPS indications indicate that IMS VoPS is supported over non-3GPP access, and wherein the UE tries to register over non-3GPP access for voice service.

8. The method of claim 1, wherein the current RAT is non-3GPP access, and wherein the IMS VoPS indication indicates that IMS VoPS is not supported over the current RAT.

9. The method of claim 8, wherein the IMS VoPS indications indicate that IMS VoPS is supported over 3GPP access, and wherein the UE ignores the indications.

10. The method of claim 1, wherein the registration accept message further carries information on whether IMS VoPS is supported over 5G new radio (NR), 4G LTE, and non-3GPP access independently.

11. A User Equipment (UE), comprising:

a transmitter that transmits a registration request message in mobile communication network, wherein the registration request message is sent over a 3GPP access or a non-3GPP access;

a receiver that receives a registration accept message from the network, wherein the accept message comprises an IP Multimedia Subsystem (IMS) voice over Packet-Switched (VoPS) service indications, wherein the IMS VoPS service indications comprises one or more bits indicating whether IMS VoPS is supported over the 3GPP and the non-3GPP access; and a control and configuration circuit that determines whether IMS VoPS is supported over the 3GPP access and the non-3GPP access, and the UE in response to, at a first time, receiving the IMS VoPS service indication sent over the 3GPP access indicating that the IMS VoPS is not supported over the 3GPP access and that the IMS VoPS is supported over the non-3GPP access, determines that the IMS VoPS service indication is correct and registers to the mobile communication network over the non-3GPP access or over another 3GPP radio access technology (RAT) for voice service, and in response to, at a second time, receiving the IMS VoPS service indication sent over the non-3GPP access, determines that the IMS VoPS service indication for the 3GPP access is incorrect and ignores the IMS VoPS service indication for the 3GPP access.

12. The UE of claim 11, wherein the registration request is an initial request, a periodic request, or a mobility request.

13. The UE of claim 11, wherein the IMS VoPS indications comprise a first bit indicating whether IMS VoPS is supported over 3GPP access.

14. The UE of claim 11, wherein the IMS VoPS indications comprise a second bit indicating whether IMS VoPS is supported over non-3GPP access.

15. The UE of claim 11, wherein the current RAT is 3GPP access, and wherein the IMS VoPS indication indicates that IMS VoPS is not supported over the current RAT.

16. The UE of claim 15, wherein the UE performs voice domain selection for voice service.

17. The UE of claim 15, wherein the IMS VoPS indications indicate that IMS VoPS is supported over non-3GPP access, and wherein the UE tries to register over non-3GPP access for voice service.

18. The UE of claim 11, wherein the current RAT is non-3GPP access, and wherein the IMS VoPS indication indicates that IMS VoPS is not supported over the current RAT.

19. The UE of claim 18, wherein the IMS VoPS indications indicate that IMS VoPS is supported over 3GPP access, and wherein the UE ignores the indication.

20. The UE of claim 11, wherein the registration accept message further carries information on whether IMS VoPS is supported over 5G new radio (NR), 4G LTE, and non-3GPP access independently.

* * * * *